(12) United States Patent
Cho et al.

(10) Patent No.: US 8,001,440 B2
(45) Date of Patent: Aug. 16, 2011

(54) APPARATUS AND METHOD FOR PERFORMING HARQ TRANSMISSION IN A WIRELESS COMMUNICATION SYSTEM

(75) Inventors: Jeong-Woo Cho, Suwon-si (KR); Yu-Chul Kim, Seoul (KR); Yong Chang, Seongnam-si (KR); Jae-Hong Chon, Gwangju (KR)

(73) Assignee: Samsung Electronics Co., Ltd (KR)

( * ) Notice: Subject to any disclaimer, the term of this patent is extended or adjusted under 35 U.S.C. 154(b) by 1177 days.

(21) Appl. No.: 11/728,420

(22) Filed: Mar. 26, 2007

(65) Prior Publication Data
US 2007/0245203 A1 Oct. 18, 2007

(30) Foreign Application Priority Data
Mar. 24, 2006 (KR) .................. 10-2006-0027067

(51) Int. Cl.
*G08C 25/02* (2006.01)
*H04L 1/18* (2006.01)
(52) U.S. Cl. ...................... 714/748; 370/329
(58) Field of Classification Search .................. 714/748; 370/329
See application file for complete search history.

(56) References Cited

U.S. PATENT DOCUMENTS

| 6,700,867 B2* | 3/2004 | Classon et al. ................ 370/216 |
| 2002/0152342 A1* | 10/2002 | Das et al. ....................... 710/117 |
| 2003/0079170 A1* | 4/2003 | Stewart et al. ................ 714/755 |
| 2004/0160919 A1* | 8/2004 | Balachandran et al. ...... 370/335 |

FOREIGN PATENT DOCUMENTS

| EP | 1 564 924 | 1/2005 |
| KR | 1020010080057 | 8/2001 |
| KR | 1020030043296 | 6/2003 |
| KR | 1020050043302 | 5/2005 |

* cited by examiner

*Primary Examiner* — Sam Rizk
(74) *Attorney, Agent, or Firm* — The Farrell Law Firm, P.C.

(57) ABSTRACT

An apparatus and method for optimizing a data rate in a wireless communication system supporting Hybrid Automatic Repeat reQuest (HARQ) are provided. The method includes estimating Channel State Information (CSI) of a signal to be transmitted, by using other CSIs received in a previous cycle; determining an instantaneous data rate, at which the CSI is transmitted with an optimal data rate, and the amount of redundancy information to be retransmitted; and retransmitting the redundancy information of the signal according to the amount of redundancy information and the instantaneous data rate, if a receiving end requests signal retransmission. Accordingly, the packet can be transmitted with the optimal data rate.

20 Claims, 7 Drawing Sheets

APPARATUS AND METHOD FOR PERFORMING HARQ TRANSMISSION IN A WIRELESS COMMUNICATION SYSTEM

PRIORITY

This application claims priority under 35 U.S.C. §119 to a Korean Patent Application filed in the Korean Intellectual Property Office on Mar. 24, 2006 and assigned Serial No. 2006-27067, the contents of which are incorporated herein by reference.

BACKGROUND OF THE INVENTION

1. Field of the Invention

The present invention relates to an apparatus and method for performing Hybrid Automatic Repeat reQuest (HARQ) transmission, and in particular, to an apparatus and method for optimizing a data rate by in a wireless communication system supporting HARQ.

2. Description of the Related Art

A Hybrid Automatic Repeat reQuest (HARQ) scheme is an advanced form of an Automatic Repeat reQuest (ARQ) scheme. In the ARQ scheme, erroneous and lost packets are retransmitted so that data reliability can be enhanced by reducing packet errors and loss. According to the ARQ scheme, an initially transmitted packet is retransmitted without alteration. In this case, information on previously transmitted packets is not utilized at all. Conversely, in the HARQ scheme, information on the previously transmitted packets is utilized for packet retransmission, thereby enhancing packet reliability.

The HARQ scheme may use either a Chase Combining (CC) scheme or an Incremental Redundancy (IR) scheme. In the CC scheme, a packet is detected by utilizing both information on a retransmitted packet and information on a previously transmitted packet. Therefore, when packet transmission is not successful, the same packet as an original packet is retransmitted to a receiving end. The original packet and the retransmitted packet are combined in the receiving end so as to detect the original packet. In this case, the receiving end can achieve a unique HARQ combining effect.

On the other hand, in the IR scheme, the original packet is transmitted at the time of initial transmission and then transmits redundancy information generated when the original packet is coded using the retransmitted packet. The redundancy information may be generated using various coding schemes such as a turbo coding scheme, a Rate Compatible Punctured Convolutional (RCPC) coding scheme, and a Low Density Parity Check (LDPC) coding scheme. For example, if the transmitting end employs the IR scheme, a redundancy information block is generated by coding the data to be transmitted and then the original packet is initially transmitted to the receiving end. Thereafter, if the original packet is not successfully transmitted, the transmitting end transmits to the receiving end the redundancy information block having the same length as the original packet. The transmitting end transmits the redundancy information block generated using any one of the aforementioned coding schemes, instead of transmitting the original packet, when the receiving end requests retransmission.

The receiving end may combine the original packet received from the transmitting end and the redundancy information block received during a retransmission process, to detect the original packet. In this case, the receiving end may achieve a unique HARQ combining effect as well as a coding gain.

As described above, if a wireless communication system uses the IR scheme, the transmitting end retransmits the redundancy information having the same length as the original packet when the receiving end requests retransmission. A packet transmission success rate varies depending on a wireless channel environment (e.g., Signal to Noise Ratio (SNR)) of the wireless network system. Therefore, the transmission success rate of respective retransmission packets varies depending on the wireless channel environment according to the conventional IR scheme in which redundancy information having a specific length is retransmitted. Accordingly, an optimal data rate cannot be achieved in the wireless communication system.

SUMMARY OF THE INVENTION

The present invention provides an apparatus and method for optimizing a data rate when a wireless communication system employs a Hybrid Automatic Repeat reQuest (HARQ) scheme.

The present invention also provides an apparatus and method for optimizing a data rate by regulating the amount of redundancy information to be retransmitted according to a channel environment when an Incremental Redundancy (IR) scheme is employed in a wireless communication system supporting HARQ.

The present invention also provides an apparatus and method for optimizing a data rate by using a Modulation and Coding Scheme (MCS) and by regulating the amount of redundancy information when an IR scheme is employed in a wireless communication system supporting HARQ.

According to one aspect of the present invention, there is provided a retransmission method for a transmitting end in a wireless communication system supporting HARQ. The method includes estimating Channel State Information (CSI) of a signal to be transmitted, by using other CSIs received in a previous cycle; determining an instantaneous data rate, at which the CSI is transmitted with an optimal data rate, and the amount of redundancy information to be retransmitted; and retransmitting the redundancy information of the signal according to the amount of redundancy information and the instantaneous data rate, if a receiving end requests signal retransmission.

According to another aspect of the present invention, there is provided an apparatus for a transmitting end in a wireless communication system supporting HARQ. The apparatus includes a channel state estimator that estimates CSI of a signal to be transmitted, by using other CSIs received in a previous cycle; a HARQ controller that determines an instantaneous data rate, at which the CSI is transmitted with an optimal data rate, and the amount of redundancy information; and an encoder that encodes data according to the instantaneous data rate and retransmits redundancy information on a signal to be transmitted according to the amount of the redundancy information at the time of retransmission.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will be described herein below with reference to the accompanying drawings. In the following description, well-known functions or constructions are not described in detail since they would obscure the invention in unnecessary detail.

A technique for optimizing a data rate of the present invention will be described when an Incremental Redundancy (IR) scheme is employed in a wireless communication system supporting Hybrid Automatic Repeat reQuest (HARQ). This technique allows an optimal data rate to be obtained by regulating the amount of redundancy information that is retransmitted according to a channel environment in the wireless communication system supporting HARQ.

Although the wireless communication system employs an Orthogonal Frequency Division Multiplexing (OFDM) scheme as an example in the descriptions below, the present invention is able to employ other schemes. Thus, the present invention may be applied to all wireless packet data systems as long as the HARQ scheme is employed therein.

Throughout the descriptions, one cycle is defined as a time period which ranges from a time point when one original packet is attempted to be initially transmitted to a time point when retransmission is attempted due to a failed transmission in the wireless communication system. In this case, the wireless communication system uses the same Modulation and Coding Scheme (MCS) within one cycle.

In addition, the wireless channel used by the wireless communication system is a slow fading channel that is a wireless channel in which a fading characteristic changes slowly with time. Further, the Signal to Noise Ratio (SNR) value is the same within one cycle. However, the present invention may also be applied when the wireless communication system uses a fast fading channel.

Figure 1:
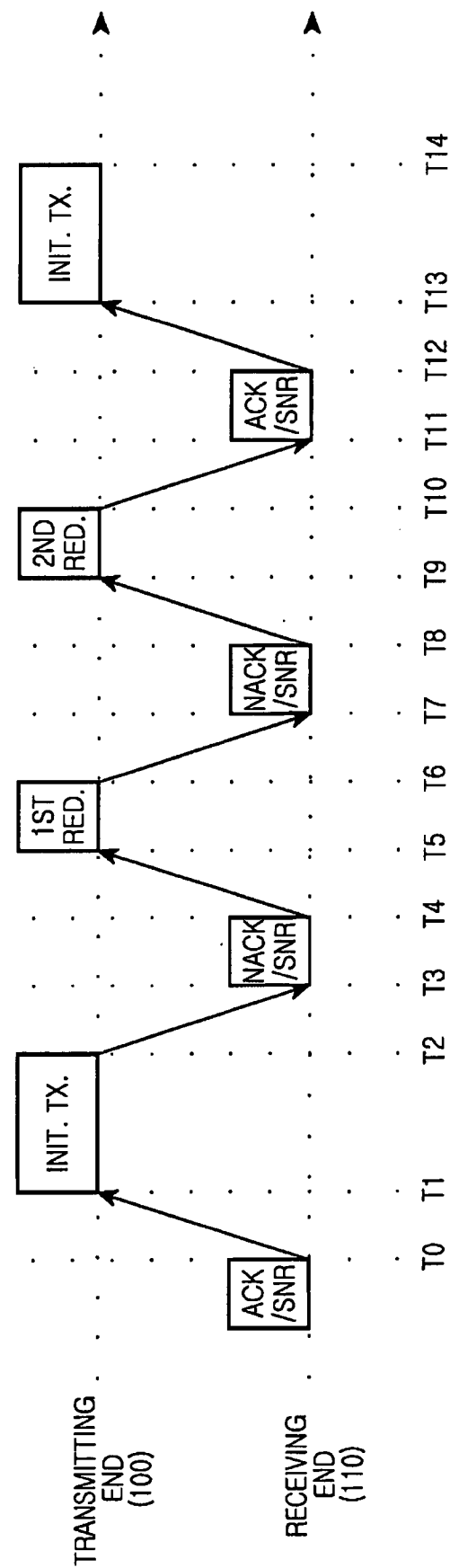
FIG. 1 illustrates a procedure for regulating the length of a redundancy information block using a Hybrid Automatic Repeat reQuest (HARQ) scheme according to the present invention.

FIG. 1 illustrates a procedure for regulating the length of a redundancy information block using the HARQ scheme according to the present invention. As described below, one cycle is defined as a time period of t1 to t13.

In FIG. 1, the operations performed in a transmitting end 100 and a receiving end 110 are shown whereby the amount of redundancy information to be retransmitted is regulated according to a channel environment (e.g., SNR) of the wireless communication system.

When SNR data received in a previous cycle is received from the receiving end 110 at time t1, the transmitting end 100 uses the received SNR data to determine an SNR value γ of a new packet to be transmitted through a channel. Similar to the SNR data received from the receiving end 110 at time t1, the SNR value γ of the packet to be transmitted is determined by using the SNR data received from the receiving end 110 immediately before the packet is transmitted. In addition, an average value of the SNR data received in the previous cycle is used to determine the SNR value γ.

By using a HARQ control table and the SNR value γ, the transmitting end 100 determines an instantaneous data rate r, at which an average data rate is maximized, and the amount of redundancy information. Specifically, the transmitting end 100 refers to the HARQ control table to check the instantaneous data rate r, which is based on the SNR value γ, and a Packet Error Ratio (PER). The transmitting end 100 computes the average data rate by applying the instantaneous data rate r and the PER to Equation 1 and determines the instantaneous data rate r and the amount of redundancy information. Here, the HARQ control table includes the PER value which is based on the SNR value γ and the instantaneous data rate r. The amount of redundancy information is represented as a ratio of the amount of an original packet to the amount of redundancy information to be retransmitted, as shown in Equation (1).

$$T(\gamma, \alpha, r, \bar{k}) = \frac{r \cdot \left(1 - \prod_{j=0}^{\bar{k}} P_e(r, (1+j \cdot g \cdot \alpha) \cdot \gamma)\right)}{1 + \alpha \sum_{k=1}^{\bar{k}} \prod_{j=0}^{k-1} P_e(r, (1+j \cdot g \cdot \alpha) \cdot \gamma)} \quad (1)$$

Here, γ denotes an SNR value of a packet to be transmitted, α denotes a ratio of the length of an original packet to the length of redundancy information to be retransmitted, and r denotes an instantaneous data rate. Further, $\bar{k}$ denotes a limited number of times of retransmission, Pe(r,γ) denotes a PER based on r and γ, and g denotes a coding gain.

Regarding Pe(r,γ) of Equation (1), an increment Δγ of the SNR value, which increases as a redundancy information block is retransmitted, may be linearly modeled according to Equation (2), below. As a result, the increment Δγ of the SNR value can be computed by multiplying the SNR value by (1+j·g·α) in Equation (1).

$$\Delta\gamma = g \cdot \alpha \cdot \gamma \quad (2)$$

$$g = \begin{cases} 1, & \text{where } \alpha = 1 \text{ or in case of using } CC \\ g_{IR}, & \text{in other cases} \end{cases}$$

Here, Δγ denotes an increment of an SNR value, which increases at a time of retransmission, g denotes a coding gain, α denotes a ratio of the length of an original packet to the length of redundancy information, and γ denotes an SNR value of a packet to be transmitted. In Equation (2), where the CC scheme is used or α=1, the original packet and the packet to be retransmitted have the same length with each other, thereby obtaining a coding gain $g_{IR}$ of 1. On the other hand, when the transmitting end 100 changes the length of the packet to be retransmitted according to a channel environment, the coding gain $g_{IR}$ is equal to or greater than 1. In this case, a time slot used to transmit the packet in Equation (1)

decreases, and a size of data to be transmitted in one packet increases. As a result, an overall average data rate increases.

In Equation 2, however, the coding gain $g_{IR}$ varies depending on not only the instantaneous data rate r but also a MCS level used for packet transmission and a packet size. In practice, the wireless communication system becomes significantly complex in order to optimize the coding gain $g_{IR}$. Thus, in the present invention, the coding gain $g_{IR}$ is simply optimized under the assumption that $g_{IR}=1$. In this case, an optimal average data rate is obtained to be equal to or less than as in the case of $g_{IR} \geq 1$. Accordingly, the optimal average data rate can be a lower bound.

Equation (1) can be obtained using Equation (3).

$$T(\gamma, \alpha, r, \bar{k}, \tau_0) = E\left(\frac{B}{\tau}\bigg|\gamma, \alpha, r, \bar{k}, \tau_0\right) = \frac{E(B|\gamma, \alpha, r, \bar{k}, \tau_0)}{E(\tau|\gamma, \alpha, r, \bar{k}, \tau_0)} \quad (3)$$

Here, $\gamma$ denotes an SNR value of a packet to be transmitted, $\alpha$ denotes a ratio of the length of an original packet to the length of redundancy information to be retransmitted, and r denotes an instantaneous data rate. Further, $\bar{k}$ denotes a limited number of times of retransmission, $\tau_0$ denotes a time slot for initial packet transmission, E(f) denotes an expectation value of f according to a probability theory, B denotes the amount of an original packet to be successfully transmitted, and $\tau$ denotes the length of time slot required until the end of cycle. For example, $B=r \times \tau_0$ is satisfied if the original packet is successfully transmitted within one cycle. Otherwise, B=0 is satisfied. Here, $\tau$ is determined according to the number of times of transmission. For example, $\tau=\tau_0$ is satisfied if transmission is initially successful. Further, a time slot of $\tau=\tau_0+j\alpha\tau_0$ is required if the redundancy information block is transmitted j times.

In Equation (3), the average data rate is obtained by dividing an expectation value of the amount B of an original packet to be successfully transmitted by an expectation value of the amount $\tau$ of time slot required for one cycle. Equation (3) can be obtained in the same manner as Equation (1) according to a renewal theory. Equation (1) is the same as Equation (3) except that $\tau_0$ is canceled. In the case of successful packet transmission, $\tau_0$ is cancelled since $B/\tau_0=r$, and otherwise, $\tau_0$ is cancelled since B=0.

The transmitting end 100 initially transmits the original packet to the receiving end 110 according to the instantaneous data rate r selected using Equation (1) for the time period of t1 to t2.

At time t3, the receiving end 110 determines the SNR value of the packet received from the transmitting end 100 and also determines whether the packet is successfully received. The receiving end 110 transmits the determination results to the transmitting end 100. If the packet is successfully transmitted, the receiving end 110 transmits an ACK signal. Otherwise, the receiving end 110 transmits an NACK signal. The following descriptions will be given under the assumption that the receiving end 110 transmits the NACK signal to the transmitting end 100.

At time t5, the receiving end 110 provides the transmitting end 100 with the SNR data of the packet to be transmitted and information on whether the packet is successfully received. If the NACK signal is received, the transmitting end 100 uses the SNR data of the packet to be transmitted so as to determine the instantaneous data rate and the amount of redundancy information to be retransmitted to the receiving end 110 for the time period of t5 to t6. The transmitting end 100 retransmits the redundancy information to the receiving end 110 according to the amount of redundancy information and the instantaneous data rate.

At time t7, the receiving end 110 checks SNR data of the redundancy information and information on whether the redundancy information is successfully received, which are received from the transmitting end 100, and then transmits the checking result to the transmitting end 100.

At time t9, the receiving end 110 provides the transmitting end 100 with the SNR data of the redundancy information to be retransmitted and the information on whether the redundancy information is successfully received. If the NACK signal is received, the transmitting end 100 determines the amount of redundancy information to be retransmitted and the instantaneous data rate according to the SNR data of the redundancy information. The transmitting end 100 retransmits the redundancy information to the receiving end 110 according to the amount of redundancy information and the instantaneous data rate.

At time t11, the receiving end 110 checks the SNR data of the redundancy information and the information on whether the redundancy information is successfully received, which are received from the transmitting end 100, and then transmits the checking result to the transmitting end 100. It will be assumed that the receiving end 110 transmits the ACK signal.

At time t13, if the ACK signal is received from the receiving end 110, the transmitting end 100 performs a next cycle. At this time, by using the SNR data received at times t5, t9, and t13, the transmitting end 100 computes an SNR value for transmitting an original packet of the next cycle to the receiving end 110. Furthermore, the transmitting end 100 computes this SNR value by using the SNR data received at time t13.

Figure 2:
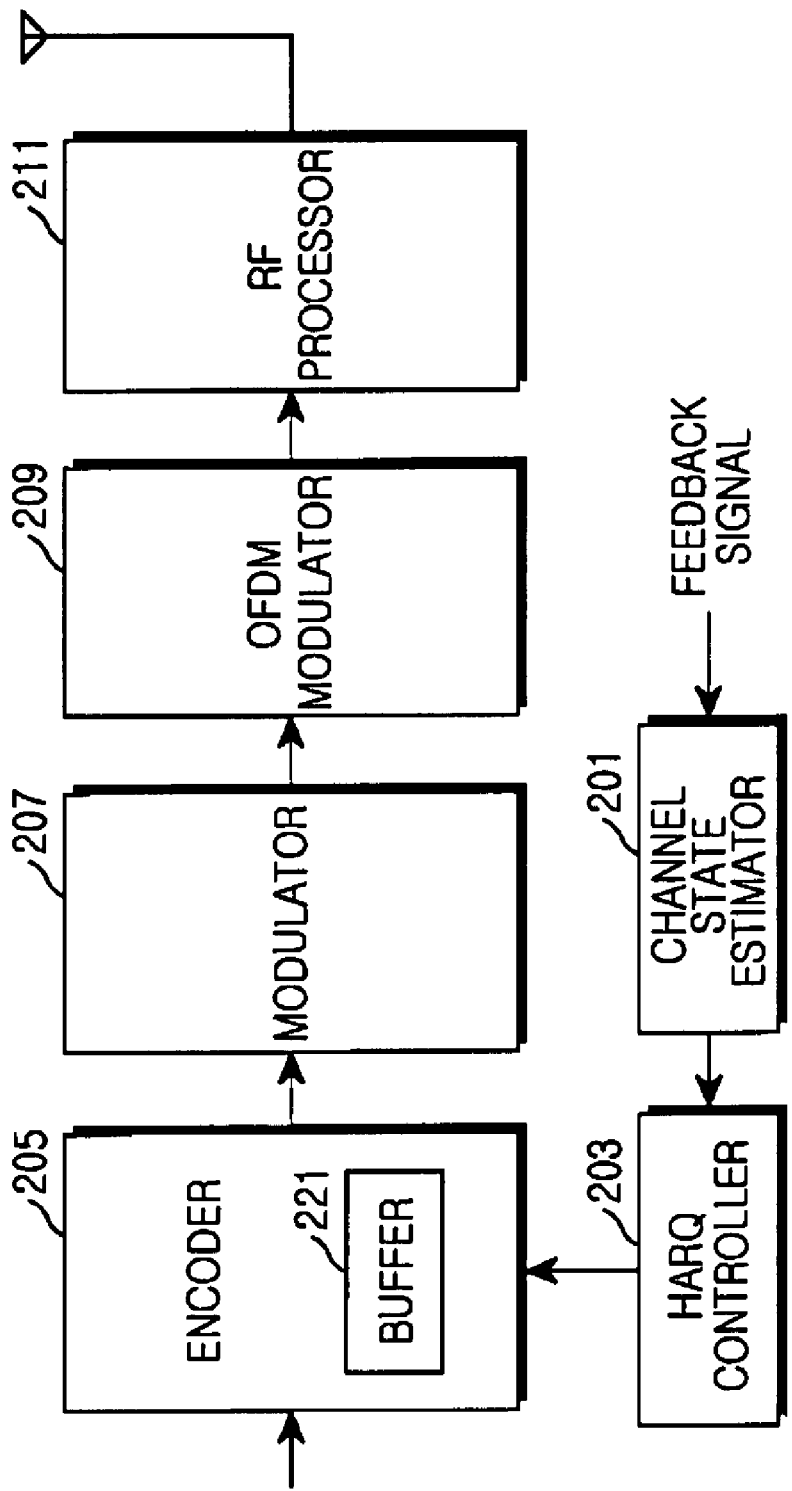
FIG. 2 is a block diagram of a wireless communication system in which the length of a redundancy information block is regulated using a HARQ scheme according to the present invention.

The transmitting end 100 has a structure of FIG. 2 and regulates the amount of redundancy information to be retransmitted according to the channel environment (e.g., SNR) as described above.

FIG. 2 is a block diagram of a wireless communication system in which the length of a redundancy information block is regulated using the HARQ scheme according to the present invention.

In FIG. 2, the aforementioned transmitting end 100 includes a channel state estimator 201, a HARQ controller 203, an encoder 205, a modulator 207, an OFDM modulator 209, and a Radio Frequency (RF) processor 211.

The channel state estimator 201 uses SNR data of a previous cycle to estimate channel state information (CSI) (e.g., SNR) of a packet to be transmitted to the receiving end 110 of FIG. 1. For example, the channel state estimator 201 estimates the CSI by using an average value of the SNR data received from the receiving end 110 during the previous cycle. Furthermore, the channel state estimator 201 estimates the CSI by using the most recently received SNR data.

By using a HARQ control table and an SNR value estimated by the channel state estimator 201, the HARQ controller 203 determines an MCS level to transmit the packet and also determines the amount of redundancy information to retransmit the packet. The HARQ control table contains not only the SNR value but also a PER value based on respective instantaneous data rates.

For example, the channel state estimator 201 may use the SNR data of the previous cycle so as to determine an SNR value of a new packet to be transmitted through a channel. Thereafter, by applying the SNR value and the PER value to Equation (1), the HARQ controller 203 determines an instantaneous data rate, at which an average data rate is maximized, and also determines the amount of redundancy information for packet retransmission. Furthermore, the HARQ controller 203 determines the MCS level by using the PER value which is based on the instantaneous data rate and the SNR value.

The encoder 205 encodes the original packet by using the MCS level determined by the HARQ controller 203 and then transmits the encoded packet to the modulator 207. In this case, for packet retransmission, the encoder 205 temporarily stores the encoded packet in a buffer 221. At the time of initial transmission, the encoder 205 transmits only the original packet to the modulator 207. When the receiving end 110 requests packet retransmission, the encoder 205 transmits the to-be-retransmitted redundancy information stored in the buffer 221 to the modulator 207 according to the amount of redundancy information received from the HARQ controller 203.

The modulator 207 modulates the encoded data received from the encoder 205 by using a modulation method based on the MCS level determined by the HARQ controller 203. For example, the modulation method may include a Binary Phase Shift Keying (BPSK) method, a Quadrature Phase Shift Keying (QPSK) method, or a 16-Quadrature Amplitude Modulation (16-QAM) method, and a 64-QAM method.

The OFDM modulator 209 performs Inverse Fast Fourier Transform (IFFT) on a frequency domain signal received from the modulator 207 in order to convert the frequency domain signal into a time domain signal.

The RF processor 211 converts a base-band signal received from the OFDM modulator 209 into an RF signal of a high frequency and then transmits the converted signal through an antenna.

Figure 3:
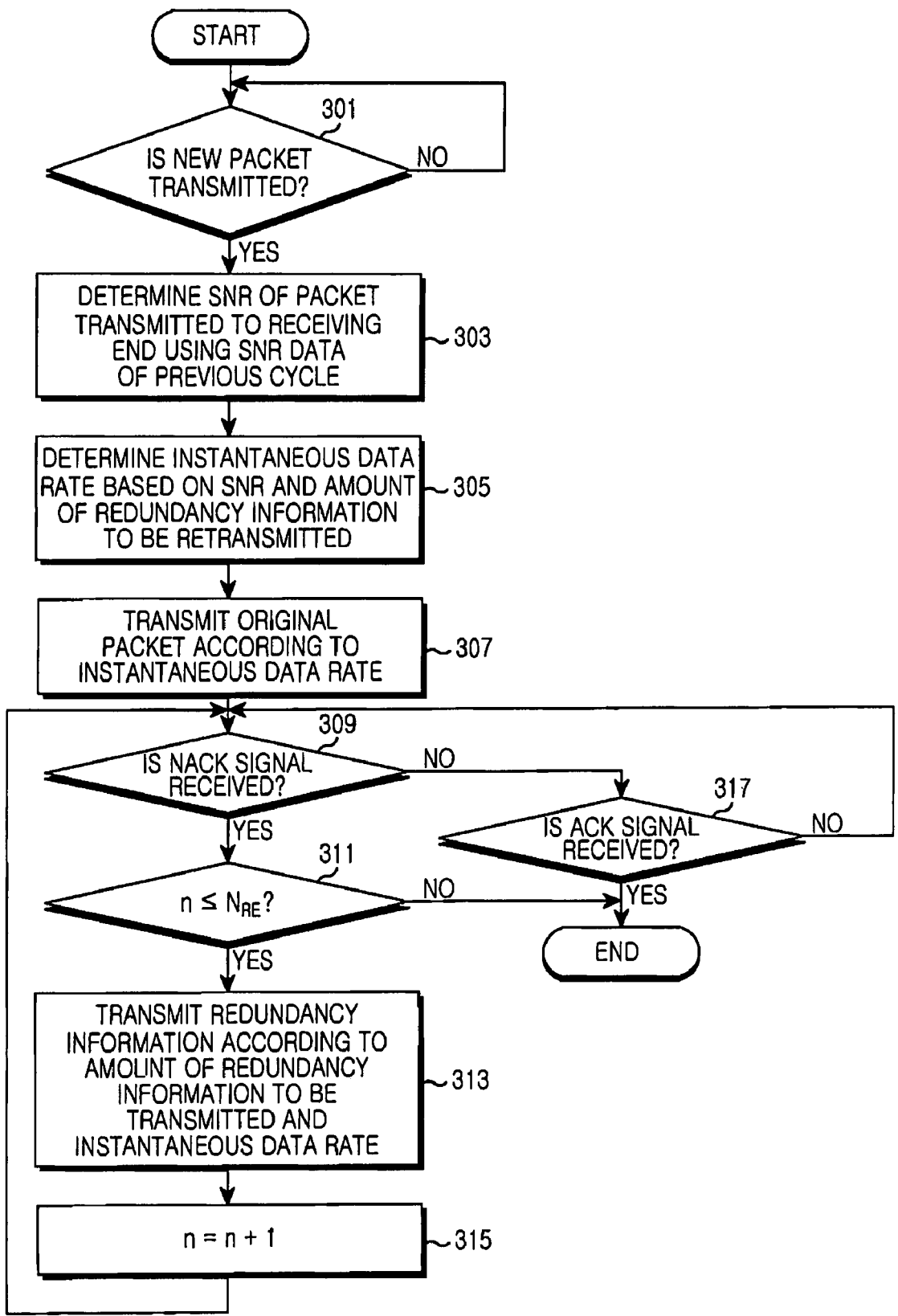
FIG. 3 is a flow diagram of a process performed in a transmitting end for regulating the length of a redundancy information block using a HARQ scheme according to the present invention.

FIG. 3 is a flow diagram of a process performed in the transmitting end 100 of FIG. 1 for regulating the length of a redundancy information block using the HARQ scheme according to the present invention.

In FIG. 3, whether to transmit a new packet is determined in step 301. If it is determined to transmit a new packet, an SNR value of the new packet to be transmitted through a channel is computed using SNR data received from the receiving end 110 of FIG. 1 during a previous cycle in step 303. An SNR value of the new packet is determined using the most recently received SNR data. In addition, the SNR value of the new packet is computed using an average value of the SNR data received from the receiving end 110 during the previous cycle.

The amount of redundancy information to be retransmitted and an instantaneous data rate, at which an average data rate of Equation 1 is maximized, are determined using the computed SNR value along with a predetermined HARQ control table in step 305.

After the instantaneous data rate and the amount of redundancy information are determined, the original packet is transmitted to the receiving end 110 according to the instantaneous data rate in step 307. The original packet is encoded and the redundancy information is stored in the buffer 211 of FIG. 2.

Next, it is determined whether an NACK signal is received from the receiving end 110 in step 309.

If the NACK signal is not received, it is checked whether an ACK signal is received in step 317. If the ACK signal is not received, the procedure returns to step 309.

If the ACK signal is received, it is considered that the packet is successfully transmitted, thereby ending the procedure.

If, however, the NACK signal is received, the number n of times of retransmission of the redundancy information for the received NACK signal is compared with the limited number $N_{re}$ of times of retransmission in step 311.

If the number of times of retransmission of the redundancy information is greater than the limited number of times of retransmission ($n>N_{re}$), the procedure is ended.

Otherwise ($n \leq N_{re}$), the redundancy information stored in the buffer 211 is transmitted to the receiving end 110 in step 313 according to the amount of redundancy information and the instantaneous data rate determined in step 305.

Next, the number n is incremented by one (n=n+1) in step 315, and then returning back to step 309, it is determined whether the NACK signal is received from the receiving end 110.

Figure 4:
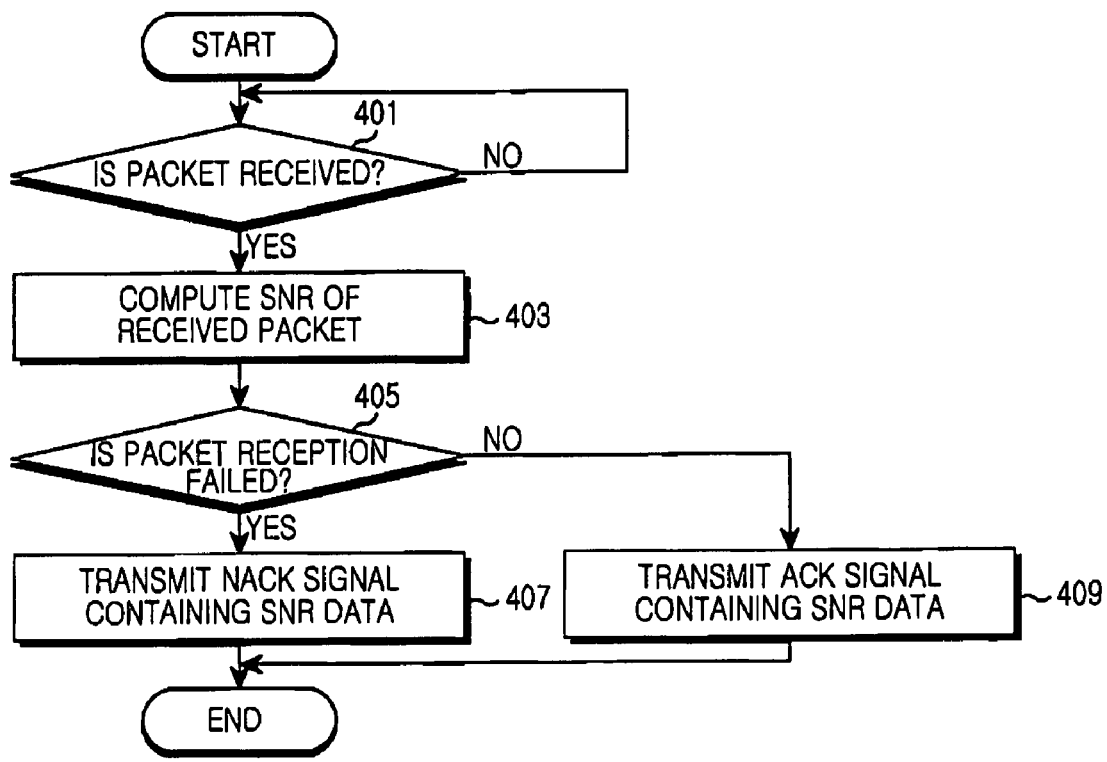
FIG. 4 is a flow diagram of a process performed in a receiving end using a HARQ scheme according to the present invention.

FIG. 4 is a flow diagram of a process performed in the receiving end 110 of FIG. 1 using the HARQ scheme according to the present invention.

In FIG. 4, it is determined whether a packet is received from the transmitting end 100 of FIG. 1 in step 401.

If the packet is received, an SNR value of the received packet is computed in step 403.

It is determined whether the received packet is successfully received without errors in step 405. For example, the receiving end 110 may use a Carrier to Interference and Noise Ratio (CINR) or Cyclic Redundancy Check (CRC) so as to determine whether the packet is successfully received.

If the packet is not successfully received, an NACK signal containing SNR data is transmitted to the transmitting end 100 in step 407. The receiving end 110 requests the transmitting end 100 to retransmit the received packet.

Next, the process is ended.

Conversely, if the packet is successfully received, an ACK signal containing the SNR data is transmitted to the transmitting end 100 in step 409. That is, the receiving end 110 transmits the ACK signal so that the transmitting end 100 can recognize the fact that the packet has been successfully received.

Next, the process is ended.

Accordingly, as described above, a PER can be enhanced by maximizing only the average data rate in the wireless communication system. To enhance the PER and also maximize the average data rate, Equation (4), below, has to be satisfied while maximizing Equation (1).

$$\prod_{j=0}^{\overline{k}} P_e(r, (1+j \cdot g \cdot \alpha)\gamma) \leq P_T \quad (4)$$

Here, γ denotes an SNR value of a packet to be transmitted, α denotes a ratio of the length of an original packet to the length of redundancy information to be retransmitted, and r denotes an instantaneous data rate. Further, $\overline{k}$ denotes a limited number of times of retransmission, Pe(r,γ) denotes a PER based on r and γ, and g denotes a coding gain.

To increase the PER according to Equation (4), a transmission failure rate has to be less than a reference value $P_T$ even after the original packet is initially transmitted and then retransmitted, that is, after one cycle is completed. In general, the reference value $P_T$ is 0.01.

Figure 5:
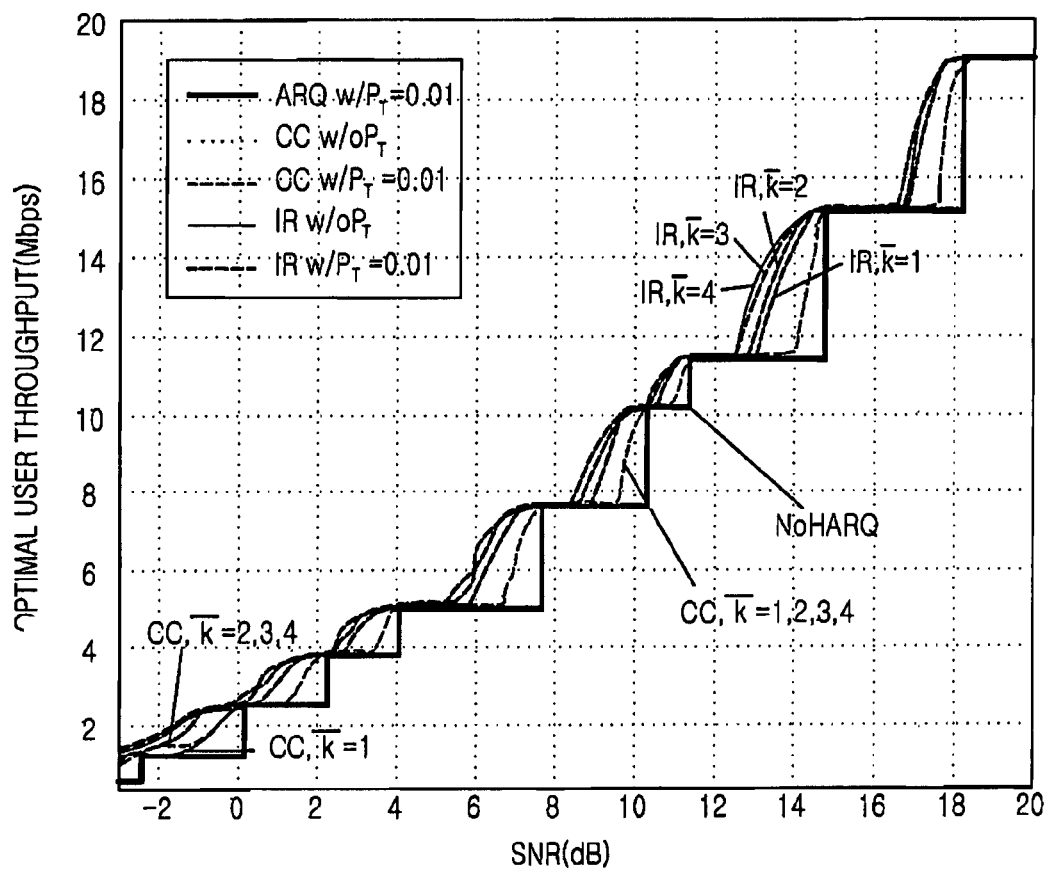
FIG. 5 is a graph illustrating variations of an optimal user throughput with respect to a Signal to Noise Ratio (SNR) according to the present invention.
Figure 6:
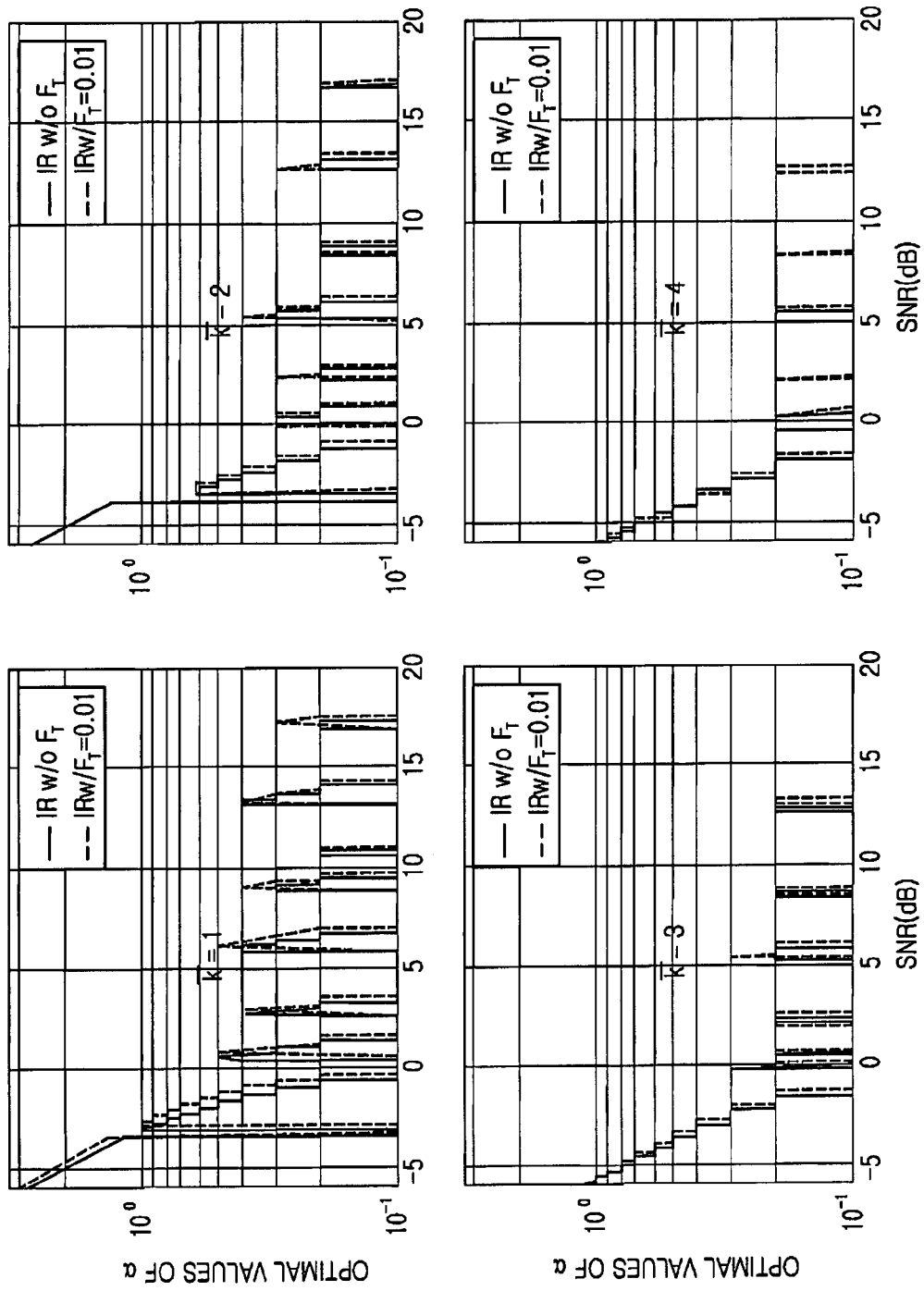
FIG. 6 shows graphs illustrating variations of the length of a redundancy information block with respect to an SNR according to the present invention.
Figure 7:
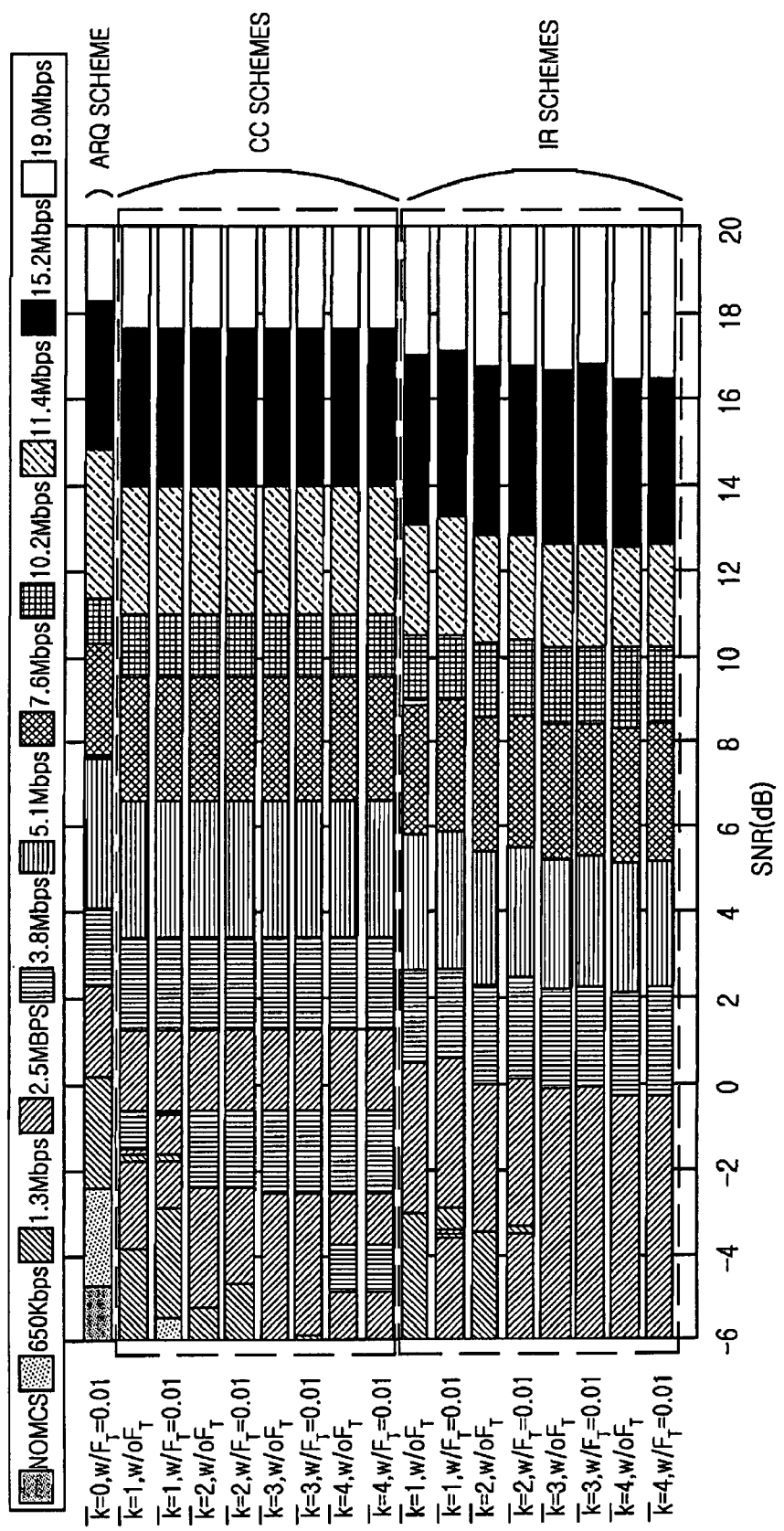
FIG. 7 is a graph illustrating variations of an optimal instantaneous data rate with respect to an SNR according to the present invention.

In the case where the amount of redundancy information to be retransmitted is regulated according to the channel environment of the wireless communication system as described above, throughput (or data rate) variations can be seen in FIGS. 5 to 7. The graphs illustrated in FIGS. 5 to 7 are obtained under the condition that the channel environment is regarded as an Additive White Gaussian Noise (AWGN)

channel environment while in an OFDMA mode of the Institute of Electrical and Electronics Engineers (IEEE) 802.16e standard.

The ratio α may have a significantly small value due to an overhead of a portion occupied by a head of a packet to be transmitted. If this is the case, the ratio α may adversely affect throughput. In the following descriptions, it will be assumed that the ratio α is a multiple number of 0.1 if the number of permitted values of the ratio α is limited to a finite number. Here, α denotes a ratio of the length of the original packet to the length of the redundancy information block.

FIG. 5 is a graph illustrating variations of an optimal user throughput with respect to an SNR according to the present invention. The horizontal axis represents an SNR value, and the vertical axis represents the optimal user throughput.

In FIG. 5, "ARQ w/$P_T$=0.01" indicates the best data rate permitted by a mobile station (or user) when transmission is simply repeated without having to use HARQ while a PER is limited to be below 0.01. "CC w/o $P_T$" indicates a data rate when Equation (1) is maximized while the ratio α is fixed to be 1. "CC w/$P_T$=0.01" indicates a data rate when Equation (1) is maximized under the condition that r and α satisfy the requirement of Equation (4) while the ratio α is fixed to be 1. Here, r denotes an instantaneous data rate.

In the mean time, according to the present invention, "IR W/O $P_T$" indicates a data rate when Equation (1) is maximized while the ratio α is not restricted. In addition, "IR w/$P_T$=0.01" indicates a data rate when Equation (1) is maximized under the condition that r and α satisfy the requirement of Equation (4) while the ratio α is not restricted.

As further shown in FIG. 5, the data rate of the receiving end 110 is higher in the cases of "IR w/o $P_T$" and "IR w/$P_T$=0.01" according to the present invention than in the conventional cases of "CC w/o $P_T$" and "CC w/$P_T$=0.01". Therefore, an average data rate can be improved when the amount of redundancy information to be retransmitted is regulated so as to maximize the data rate of the receiving end 110 by using Equation (1) provided by the present invention. In addition, even if the redundancy information is retransmitted one time in the wireless communication system, that is, $\bar{k}$=1, the data rate of the receiving end 110 is higher in the cases of "IR w/o $P_T$" and "IR w/$P_T$=0.01 than the cases of "CC W/O $P_T$" and "CC w/$P_T$=0.01". Accordingly, the data rate of the receiving end 110 can be improved even if $\bar{k}$ is less than or equal to 2.

FIG. 6 illustrates graphs illustrating variations of the length of a redundancy information block with respect to an SNR according to the present invention. The horizontal axis represents an SNR value γ, and the vertical axis represents an optimal ratio α of the length of an original packet to the length of the redundancy information block.

In FIG. 6, optimal values of α are shown with respect to the SNR values for the respective cases of the number of times of retransmission.

The lower the SNR value, the higher the optimal ratio α is required. On the other hand, the lower the number of times of retransmission, the higher the optimal ratio α is required.

FIG. 7 is a graph illustrating variations of an optimal instantaneous data rate with respect to an SNR according to the present invention. The horizontal axis represents an SNR value, and the vertical axis represents an optimal instantaneous data rate.

In FIG. 7, the optimal instantaneous data rate is shown for the case of using the ARQ scheme and the CC scheme in the wireless communication system with respect to the case of using the IR scheme according to the present invention.

The optimal instantaneous data rate is higher when the IR scheme is used rather than when the CC scheme and the ARQ scheme are used.

According to the present invention, the amount of redundancy information is regulated depending on a channel environment in a wireless communication system supporting HARQ, thereby advantageously resulting in an optimal packet data rate.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A retransmission method for a transmitting end in a wireless communication system supporting Hybrid Automatic Repeat reQuest (HARQ), comprising:
    estimating Channel State Information (CSI) of a signal to be transmitted, by using at least one CSI received in a previous cycle;
    determining an instantaneous data rate and the amount of redundancy information to be retransmitted according to the CSI; and
    retransmitting the redundancy information of the signal according to the amount of redundancy information and the instantaneous data rate, if a receiving end requests signal retransmission, wherein determining an instantaneous data rate and the amount of redundancy information includes determining the instantaneous data rate, at which the CSI is transmitted with an optimal data rate, and the amount of redundancy information by using a table containing the CSI and the PER based on the instantaneous data rate.

2. The retransmission method of claim 1, wherein estimating the CSI includes determining the CSI of the signal by using an average value of CSIs received in the previous cycle from the receiving end.

3. The retransmission method of claim 1, wherein estimating the CSI includes determining the CSI of the signal to be transmitted by using the most recently received CSI among the CSIs received in the previous cycle.

4. The retransmission method of claim 1, wherein the CSI is a Signal to Noise Ratio (SNR).

5. The retransmission method of claim 1, wherein the cycle is defined as a time period which ranges from a point in time when an original packet is initially transmitted to a point in time when the retransmission of the original packet is completed.

6. The retransmission method of claim 1, wherein determining an instantaneous data rate and the amount of redundancy information to be transmitted includes:
    computing instantaneous data rates based on the CSI and average data rates based on the amount of redundancy information; and
    selecting the instantaneous data rate and the amount of redundancy information when any one of the average data rates reaches a maximum data rate.

7. The retransmission method of claim 6, wherein the average data rate is computed by using $$T(\gamma, \alpha, r, \bar{k}) = \frac{r \cdot \left(1 - \prod_{j=0}^{\bar{k}} P_e(r, (1+j \cdot g \cdot \alpha) \cdot \gamma)\right)}{1 + \alpha \sum_{k=1}^{\bar{k}} \prod_{j=0}^{k-1} P_e(r, (1+j \cdot g \cdot \alpha) \cdot \gamma)}$$

where γ denotes an SNR value of a packet to be transmitted, α denotes a ratio of the length of an original packet to the length of redundancy information to be retransmitted, r denotes an instantaneous data rate, $\bar{k}$ denotes a limited number of times of retransmission, Pe(r,γ) denotes a Packet Error Rate (PER) based on r and γ, and g denotes a coding gain.

8. The retransmission method of claim 6, further including:
   computing the PER according to the CSI of the signal to be transmitted and the selected instantaneous data rate; and
   determining a Modulation and Coding Scheme (MCS) level based on the PER.

9. The retransmission method of claim 1, wherein determining an instantaneous data rate and the amount of redundancy information includes determining the instantaneous data rate and the amount of redundancy information by using only instantaneous data rates in association with a PER value below a reference value among the PER values for the CSI of the signal to be transmitted, which are contained in the table.

10. The retransmission method of claim 9, wherein the instantaneous data rate is obtained when the PER value satisfies $$\prod_{j=0}^{\bar{k}} P_e(r, (1+j \cdot g \cdot \alpha)\gamma) \le P_T$$

where γ denotes an SNR value of a packet to be transmitted, α denotes a ratio of the length of an original packet to the length of redundancy information to be retransmitted, r denotes an instantaneous data rate, $\bar{k}$ denotes a limited number of times of retransmission, Pe(r,γ) denotes a PER based on r and γ, and g denotes a coding gain.

11. The retransmission method of claim 1, further including:
   checking for the CSI of the signal to be transmitted and the PER based on the instantaneous data rate from the table containing the CSI and the PER based on the instantaneous data rate; and
   determining the MCS level according to the PER.

12. The retransmission method of claim 1, further including transmitting the signal according to the instantaneous data rate when the signal is initially transmitted.

13. The retransmission method of claim 1, further including determining whether the signal is retransmitted by comparing the number of times of retransmission with the limited number of times of retransmission when retransmission is requested.

14. An apparatus for a transmitting end in a wireless communication system supporting Hybrid Automatic Repeat reQuest (HARQ), comprising:
   a channel state estimator that estimates Channel State Information (CSI) of a signal to be transmitted, by using at least one CSI received in a previous cycle;
   a HARQ controller that determines an instantaneous data rate and the amount of redundancy information according to the CSI, wherein the HARQ controller includes a table that contains a Packet Error Rate (PER) which is based on the CIS and the instantaneous data rate, computes average data rates for the CSI of the signal to be transmitted by using the PER value contained in the table, and selects the instantaneous data rate and the amount of redundancy information when any one of the average data rates reaches the maximal data rate; and
   an encoder that encodes data according to the instantaneous data rate and retransmits redundancy information of the signal to be transmitted according to the amount of the redundancy information at the time of retransmission.

15. The apparatus of claim 14, wherein the channel state estimator determines the CSI of the signal to be transmitted by using an average value of the CSIs received in the previous cycle.

16. The apparatus of claim 14, wherein the channel state estimator determines the CSI of the signal to be transmitted by using the most recently received CSI among the CSIs received in the previous cycle.

17. The apparatus of claim 14, wherein the channel state estimator determines a Signal to Noise Ratio (SNR) of the signal to be transmitted.

18. The apparatus of claim 14, wherein the HARQ controller checks for the CSI of the signal to be transmitted and the PER based on the instantaneous data rate from the table, and determines a Modulation and Coding Scheme (MCS) level based on the PER.

19. The apparatus of claim 18, wherein the encoder encodes the signal to be transmitted according to the MCS level determined by the HARQ controller.

20. The apparatus of claim 14, wherein the encoder includes a buffer that stores an encoded packet so as to output redundancy information according to the amount of redundancy information stored in the buffer when retransmission is requested.

* * * * *